United States Patent Office 2,968,725
Patented Jan. 17, 1961

2,968,725

X-RAY IMAGE INTENSIFYING SCREEN

Michel Ter-Pogossian, University City, Mo., assignor to Mallinckrodt Chemical Works, St. Louis, Mo., a corporation of Missouri No Drawing. Filed June 20, 1956, Ser. No. 592,479

6 Claims. (Cl. 250—80)

This invention relates to new and improved intensifying screens for radiography.

Briefly, the present invention relates to an improved intensifying screen adapted to be positioned against a photographic film for intensifying the effect of X-rays on the film by emission of a substantial portion of the energy absorbed from the X-rays as radiation lying in the blue-violet-ultraviolet region of the spectrum, without excessive diffusion of said radiation such as would cause a blurred or distorted image on the film, comprising a sheet of X-ray transparent supporting material which is opaque to visible light and a fluorescent coating on one side thereof, said fluorescent coating being of a substantially uniform thickness in the order of 0.006 to 0.01 inch and comprising a fluorophor having an absorption peak for X-radiation having an energy lying within the range of 30–70 kev. and emitting a substantial portion of the energy so absorbed as radiation lying in the blue-violet-ultraviolet region of the spectrum, the fluorophor consisting of an alkali metal iodide activated with a thallium compound, and a binder for the fluorophor, the binder being substantially transparent to X-radiation and to blue-violet-ultraviolet light, the screen being adapted to be pressed in close contact with the photographic film with a coated side of the screen toward the film, whereby distortion and diffusion of rays of blue-violet-ultraviolet light traversing the fluorophor are minimized and an accurate image is produced on the film.

Photographic film has only limited sensitivity to the X-ray region of the spectrum. In order to reduce the amount of radiation necessary to give a satisfactorily dense image it has been customary to use X-ray sensitive fluorescent materials which convert the X-rays to radiation of longer wavelength in the blue-violet-ultraviolet region of the spectrum, to which photographic film is most sensitive. It has been proposed to incorporate the fluorescent materials directly in the photographic emulsion, but most commonly they have been incorporated in a separate intensifying screen which is placed in close contact with the photographic emu'sion during the exposure to the X-rays. Of the screens heretofore available, the simplest and generally the most satisfactory have been of the coated type, e.g., an X-ray sensitive fluorescent coating applied to one side of a sheet of some X-ray transparent supporting material, such as Bristol board for example. Such coating consists essentially of an X-ray sensitive fluorophor, that is a substance which fluoresces when excited by X-rays, and a binder. Auxiliary substances have sometimes been incorporated in the coating to absorb scattered radiation, increase the X-ray opacity of the coating, or serve other incidental purposes. Primarily, however, the characteristics of such coatings depend on the thickness of the coating, its opacity to X-rays, the nature and particle size of the fluorophor, and the optical properties of the fluorescent coating which determine the amount of emitted light reaching the photographic film. Calcium tungstate and barium lead sulfate have been the fluorophors most commonly used heretofore. However, the many deficiencies of these screens are evidenced by the many expedients which have been proposed for mitigating one or another of their defects.

Among the objects of this invention are the provision of coated screens having a substantially greater intensification factor than coated screens heretofore available; the provision of screens which are less sensitive to scattered X-radiation; the provision of screens which provide substantially greater contrast when used in conjunction with iodine-containing X-ray contrast agents; the provision of improved intensifying screens which are simple and economical to manufacture; and the provision of improved coating compositions for preparing X-ray intensifying screens. Other objects and features will be in part apparent and in part pointed out hereinafter.

The invention accordingly comprises the products hereinafter described, the scope of the invention being indicated in the following claims.

The X-ray generating machines conventionally used for X-day diagnosis emit radiation whose effective energy range is from about 30 to about 70 kev. as generally operated using an applied voltage of about 50–100 kilovolts.

The effectiveness of an intensifying screen depends, among other things, upon the total amount of radiation which is absorbed and the efficiency with which the fluorophor contained in the screen is able to convert the absorbed radiation into useful emitted radiation. In general, both tungsten and lead, which have been employed in conventional intensifying screens, are excellent absorbers for certain kinds of X-radiation because of their high atomic numbers. However, it has been found that these materials are actually relatively poor absorbers for the X-radiation normally available from conventional X-ray machines. Calcium tungstate, for example, has an absorption band at 70 kev., but its capacity to absorb radiation of lower energy, which represents the greater part of the radiation available from conventional X-ray machines, is far below that absorbed at its absorption band. Calcium tungstate is therefore able to absorb only a small part of the available radiation unless objectionably thick coatings are employed. Calcium tungstate has a further disadvantage. In passing through objects such as the human body, an appreciable part of the primary radiation is deflected and loses part of its energy and this radiation of lower energy and higher wavelengths is commonly referred to as scattered radiation. The capacity of calcium tungstate to respond to scattered radiation is relatively much greater than its ability to respond to the primary radiation, which detracts from the quality of the image which it is able to supply. Lead sulfate has a principal absorption band for radiation having energy of 88 kev. and suffers from the same disadvantages as calcium tungstate.

In accordance with the present invention, a very substantial improvement in the efficiency and usefulness of X-ray intensifying screens is obtained by employing a fluorophor which has an absorption band generally corresponding to the effective emission from conventional X-ray machines and which is relatively transparent to radiation of both shorter and longer wavelengths than the said effective emission. Screens containing such fluorophors are capable of maximum utilization of the primary effective radiation and are relatively less excited by scattered radiation. The screens of this invention have intensifying factors several times greater than those of conventional screens based on calcium tungstate and barium and lead sulfate.

For use in making the intensifying screens of the present invention, iodine possesses the desired absorption characteristics to a remarkable degree. It has a principal absorption band at 34 kev. It is relatively transparent to radiation having an energy less than 34 kev. but exhibits relatively high absorption throughout the effective range of 34–70 kev. While iodine compounds as such are only negligibly fluorescent, as is well known, however, by incorporating certain foreign elements, known as activators, in certain iodides, activated substances are obtained which are strongly fluorescent in the blue-violet-ultraviolet region of the spectrum. Thallium activated potassium iodide containing 0.1–1.0% thallium has been found very suitable for making the screens of the present invention.

Thallium activated sodium iodide, while requiring more protection against the deleterious effect of moisture, has also been found to be useful. It has the same absorption characteristics as potassium iodide and has somewhat greater efficiency for converting the absorbed X-radiation into photographically useful light.

The activated iodides have a further advantage not shared by fluorophors based on other elements. As is well known, iodinated compounds are frequently used as contrast agents in X-ray diagnosis. With the aid of such agents, it is possible to visualize certain structures and organs within the human body which are only dimly visible, if at all, without the help of such agents. The intensifying screens of the present invention are ideally suited for use in conjunction with such iodinated contrast agents, since the effect of the screen then exactly complements the effect of the contrast agent and there is a substantial increase in the degree of contrast obtained.

Another factor which affects the efficiency of intensifying screens is the ability of the emitted radiation to reach the photographic film. A marked increase in efficiency has been obtained by employing fluoroescent coatings which are substantially transparent to such emitted radiation. Losses of emitted radiation due to dispersion, reflection and absorption of the emitted light within the fluorescent coating are thereby reduced to a minimum, and the maximum amount of emitted radiation is permitted to reach the photographic emulsion. Such substantially transparent coatings are obtained in a simple and convenient manner by selecting a binder having the proper physical properties. For example, when activated potassium iodide is employed as the fluorophor, polystyrene has been found to be an eminently satisfactory binder.

In place of polystyrene, other binders may of course be used. In general, polymeric substances such as polystyrene, polymethyl methacrylate, polyvinyl acetate, polyvinyl chloride, and the like are the most useful. The binder should be water impermeable and it should be soluble in solvents in which the fluorophor is substantially insoluble. In addition it should have good mechanical strength, and should be transparent to X-radiation and to blue-violet-ultraviolet light.

The screens of the present invention are conveniently and simply prepared using coating compositions which consist of a suspension of the fluorophor in a liquid medium comprising a binder and a solvent for the binder in which the fluorophor is substantially insoluble. When the fluorophor is activated potassium iodide or activated sodium iodide, polystyrene is the preferred binder, and an aromatic hydrocarbon solvent, such as benzene, toluene or xylene is a suitable solvent for use with these materials. Sufficient binder should be employed so that the interstices between the particles of fluorophor are filled with binder to protect the particles from air and moisture, but the film of binder overlying the fluorophor should preferably not be substantially thicker than 0.01 inch.

The fluoroescent coating is applied to the supporting material using conventional methods, e.g., flowing a thin film of the coating composition over the prepared surface of the support, or spreading such a film using a doctor knife held a predetermined distance above the surface of the support. To protect the fluorescent coating and to increase its transparency, it is preferable to apply a thin film of the binder over the surface of the coating.

To facilitate the dispersion of the fluorophor in the coating composition and improve the stability of the resulting suspension, a small amount of a dispersing agent is preferably incorporated in the composition. The aluminum salts of the higher fatty acids, commonly known as "Aluminum Stearates," are particularly useful for this purpose. As little as 0.1% aluminum stearate, based on the weight of the fluorophor, has been found to be beneficial and the optimum amount is approximately 0.5%. Amounts larger than 1.0% can be employed but do not benefit the suspension and are generally to be avoided.

The relationship between particle size and coating thickness and the speed and resolution of intensifying screens are well known. These relationships are not essentially different in the case of the screens of the present invention except that, because of their greater efficiency, somewhat smaller particle size and thinner fluorescent coatings are more practicable than has heretofore been the case.

The following examples illustrate the invention.

*Example 1*

Polystyrene foam (11 g.) was dissolved in dry toluene (90 ml.) in which had been dispersed a small amount (0.45 g.) of dibasic aluminum stearate. This solution was poured onto thallium activated potassium iodide (160 g.) which had been finely ground and screened through a 325 mesh sieve. The resulting product was mixed until the potassium iodide was thoroughly dispersed.

The above coating composition was applied to a sheet of conventionally prepared screen paper by flowing on a film of such thickness as to give when dry a coating approximately 0.006 inch thick on one surface of the screen paper. The fluorescent coating was given additional protection by applying a thin protective film of a solution of polystyrene (15 g.) in dry toluene (125 ml.).

The resulting screen was compared with a medium speed calcium tungstate screen. The iodide screen required only one-fourth the exposure to give a photographic image having a density equal to that obtained using the calcium tungstate screen.

*Example 2*

A dispersion (4.6 ml.) of 1.6% dibasic aluminum stearate in dry toluene was added to thallium activated potassium iodide (20 g.). To this mixture was added a solution (12.8 ml.) prepared by dissolving polystyrene foam (22 g.) in dry toluene (100 ml.). The composition was then thoroughly mixed in a ball mill until the iodide was uniformly dispersed.

A coating of the above composition 0.010 in. thick was applied to a glass support. After the coating had set but before it was dry, it was protected with a coating 0.010 in. thick of a composition prepared by dissolving polystyrene (22 g.) in dry toluene (100 ml.). Printed matter held in contact with the fluorescent coating could be clearly seen when viewed from the glass side of the screen. The activity of the screen was comparable to that described in Example 1.

*Example 3*

Example 2 was repeated using thallium activated sodium iodide in place of thallium activated potassium iodide. The dried coating was cloudier and less transparent than the similar potassium iodide screen but still transmitted light readily. The activity of the resulting screen was approximately equivalent to that of the screen described in Example 2.

While the intensifying screens of this invention are primarily of value in medical radiography, they are also useful in certain kinds of industrial radiographic techniques.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

I claim:

1. A screen adapted to be positioned against a photographic film for intensifying the effect of X-rays on the film by emission of a substantial portion of the energy absorbed from the X-rays as radiation lying in the blue-violet-ultraviolet region of the spectrum, without excessive diffusion of said radiation such as would cause a blurred or distorted image on the film, said screen comprising a sheet of substantially X-ray transparent supporting material which is opaque to visible light, and a fluorescent coating on one side of said sheet, said coating being of a substantially uniform thickness in the order of 0.006 to 0.01 inch, and said coating comprising a fluorophor which has an absorption peak for X-radiation lying within the range of approximately 30–70 kev. and which emits a substantial portion of the energy so absorbed as radiation lying in the blue-violet-ultraviolet region of the spectrum, said fluorophor consisting of an alkali metal iodide activated with a thallium compound, and a binder for said fluorophor, said binder being substantially transparent to X-radiation and to blue-violet-ultraviolet light, said screen being adapted to be pressed in close contact with the photographic film with a coated side of the screen toward the film, whereby distortion and diffusion of rays of blue-violet-ultraviolet light traversing the fluorophor are minimized and an accurate image is produced on the film.

2. A screen according to claim 1, in which the binder is water impermeable and soluble in solvents in which the fluorophor is substantially insoluble.

3. A screen according to claim 1, in which said coating includes a clear transparent film of said binder not substantially thicker than 0.01 inch overlying said fluorophor for protecting the latter.

4. A screen according to claim 1, including a dispersing agent for said fluorophor.

5. A screen according to claim 1, in which said fluorophor comprises potassium iodide activated with thallium, and said binder comprises polystyrene.

6. A screen according to claim 1, in which said fluorophor comprises sodium iodide activated with thallium, and said binder comprises polystyrene.

References Cited in the file of this patent

UNITED STATES PATENTS

| | | |
|---|---|---|
| 2,666,856 | Fua et al. | Jan. 19, 1954 |
| 2,694,153 | Reuter | Nov. 9, 1954 |
| 2,740,050 | Schultz | Mar. 27, 1956 |
| 2,851,612 | Davey | Sept. 9, 1958 |
| 2,912,589 | Dybvig | Nov. 10, 1959 |

FOREIGN PATENTS

| | | |
|---|---|---|
| 681,176 | Great Britain | Oct. 22, 1952 |

OTHER REFERENCES

Luminescence of Solids, by Leverenz, published in 1950 by John Wiley and Sons, Inc., New York, Table 5, pages 73 to 76 and 321 to 327.